(12) United States Patent
Bruns

(10) Patent No.: US 10,430,299 B1
(45) Date of Patent: Oct. 1, 2019

(54) SYSTEM AND METHOD TO AUDIT DATA SYSTEMS TO DISCOVER CHANGES AND/OR DISCREPANCIES AMONG ELEMENTS

(71) Applicant: Daniel Robert Bruns, Draper, UT (US)

(72) Inventor: Daniel Robert Bruns, Draper, UT (US)

(*) Notice: Subject to any disclaimer, the term of this patent is extended or adjusted under 35 U.S.C. 154(b) by 205 days.

(21) Appl. No.: 15/479,163

(22) Filed: Apr. 4, 2017

Related U.S. Application Data

(60) Provisional application No. 62/318,058, filed on Apr. 4, 2016.

(51) Int. Cl.
  *G06F 16/00* (2019.01)
  *G06F 11/14* (2006.01)
  *G06F 16/23* (2019.01)

(52) U.S. Cl.
  CPC ...... *G06F 11/1471* (2013.01); *G06F 16/2308* (2019.01); *G06F 16/2365* (2019.01); *G06F 2201/80* (2013.01)

(58) Field of Classification Search
  None
  See application file for complete search history.

(56) References Cited

U.S. PATENT DOCUMENTS

| | | | | |
|---|---|---|---|---|
| 2005/0256961 | A1* | 11/2005 | Alon | H04L 29/06 709/229 |
| 2008/0281833 | A1* | 11/2008 | Cain | G06Q 10/06 |
| 2011/0087618 | A1* | 4/2011 | Papina | G06Q 10/08 705/36 R |

* cited by examiner

*Primary Examiner* — Son T Hoang
(74) *Attorney, Agent, or Firm* — Plager Schack LLP; Mark H. Plager; Alexis J. Saenz

(57) ABSTRACT

A system and computer application that audits data structures for changes. The auditing process includes comparing data in an actual state metadata storage area with a projected state metadata storage area. The results of the audit may be presented as a list of items that need to be reconciled with the actual state metadata storage area. Through a web management interface, a user may execute one or more of the list of items until the data structures in the actual state storage match the data structures in the projected state storage.

8 Claims, 2 Drawing Sheets

SYSTEM AND METHOD TO AUDIT DATA SYSTEMS TO DISCOVER CHANGES AND/OR DISCREPANCIES AMONG ELEMENTS

CROSS-REFERENCE TO RELATED APPLICATIONS

This application claims benefit under 35 U.S.C. § 119(e) of U.S. Provisional Application having Ser. No. 62/318,058 filed Apr. 4, 2016, which is hereby incorporated by reference herein in its entirety.

BACKGROUND

The embodiments herein relate generally to systems for auditing data.

Data needs to be consistent from metadata through to the data warehouse structures so that the user's data warehouse can load and process data correctly. Conventionally, a person needs to perform the time-consuming chore of determining how to change the data structures within a data warehouse to provide consistency in the end product. Personnel typically check metadata entries line by line to determine if the data driving the end product is consistent with a projected state of the product. When changes are entered into the system, incongruences between the last change and the projected state may cause incorrect loading issues in the application.

As can be seen, there is a need to automate this process. Embodiments of the subject technology address these problems.

SUMMARY

In one aspect, a computer program product for auditing data systems to discover changes and/or discrepancies among elements for improving the operation of computing machines, comprises a non-transitory computer readable storage medium having computer readable program code embodied therewith. The computer readable program code is configured by a processor to: detect a user update of a data source metadata through a web management interface; compare data structures in an actual state metadata storage area with corresponding data structures in a projected state metadata storage area; record discrepancies in said comparison in an audit log; display through the web management interface, the audit log including a list of data structure items in the actual state metadata storage area that need to be executed to match the corresponding data structures in the projected state metadata storage area; and execute the list of data structure items in the actual state metadata storage area until matching with the corresponding data structures in the projected state metadata storage area.

In another aspect, a method of auditing data systems, performed by a processor, to discover changes and/or discrepancies among elements for improving the operation of computing machines comprises detecting a user update of a data source metadata through a web management interface; comparing data structures in an actual state metadata storage area with corresponding data structures in a projected state metadata storage area; recording discrepancies in said comparison in an audit log; displaying through the web management interface, the audit log including a list of data structure items in the actual state metadata storage area that need to be executed to match the corresponding data structures in the projected state metadata storage area; and executing the list of data structure items in the actual state metadata storage area until matching with the corresponding data structures in the projected state metadata storage area.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

In general, embodiments of the disclosed subject technology provide a system and process that improves the performance of computing systems through a web management interface as data structures change. In general, embodiments include a system that audits data structures for changes/discrepancies between a projected state metadata storage area and an actual state of metadata within a storage area. Discrepancies may be a result of changes to data structures that have been entered into the system that have not been reconciled between storage areas and execution areas. The discrepancies may cause errors in the end product that traditionally have required manual debugging. However aspects of the subject technology identify the discrepancies and provide solutions that reconcile the discrepancies so that the data storage side is consistent with the end product side of the system.

Figure 1:
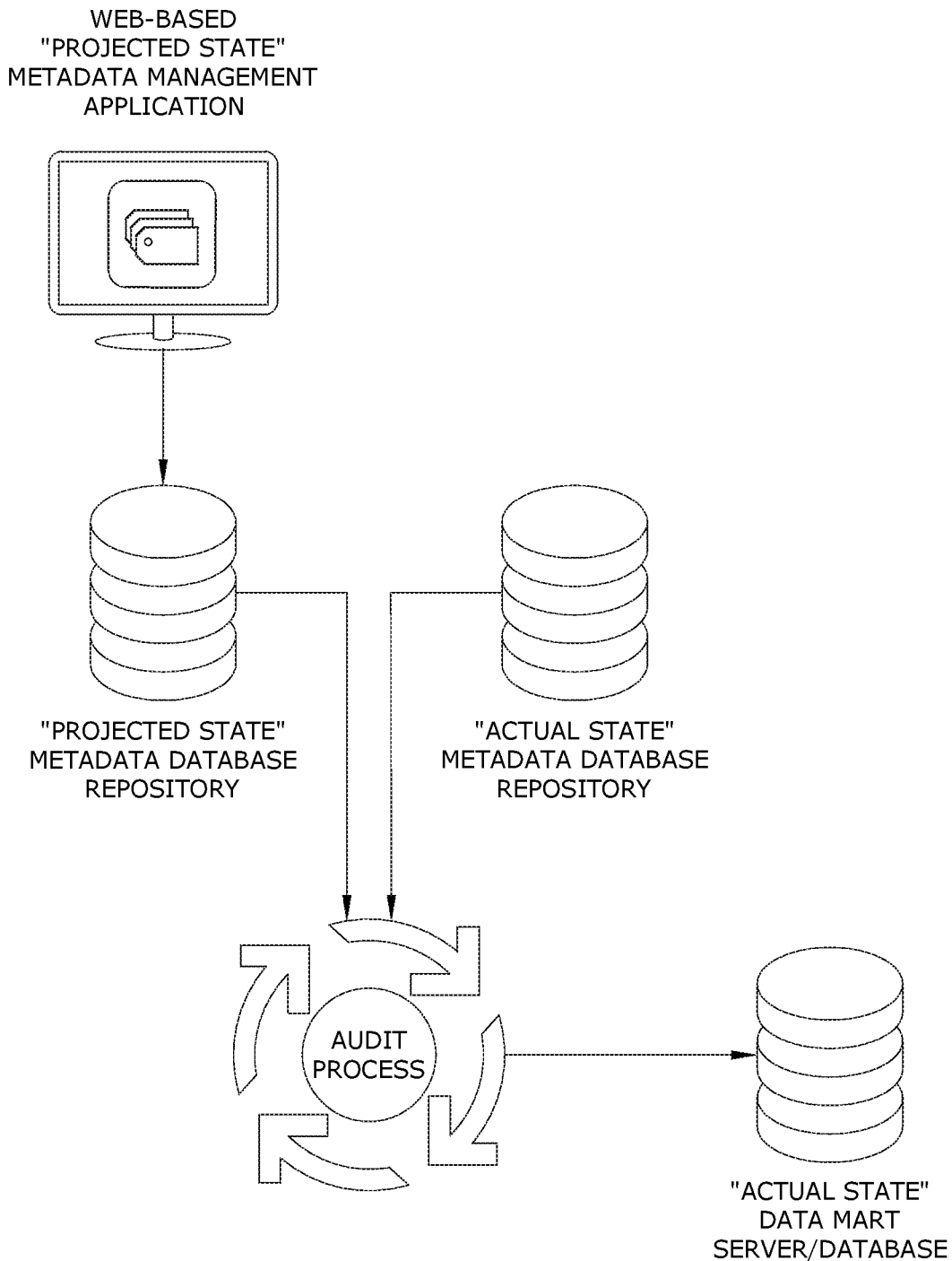
FIG. 1 is a block diagram of a system for auditing data structures in accordance with an exemplary embodiment of the subject technology.

Referring to FIG. 1, the system includes a web based metadata management application that can be interface through a computing device. The application is connected through a network to a projected state metadata database repository, an actual state metadata database repository, and to an actual state data mart server/database. The projected state metadata repository includes a list of data structures that are expected to be present in the end product as of a last audit date. The actual state metadata repository stores the metadata particular to the desired aggregations, table structures, joins, etc. that are used to: create database tables specific to the metadata, update existing data and insert new data when the system performs a data load. The actual state warehouse is the physical embodiment of the metadata stored in the metadata repository. The metadata provides the blueprint for a web based application structure; the warehouse is the structure that results from the blueprint. In operation, the end product (web based application) operates correctly when the actual data structures being entered into the system are congruent with the projected data structures. In an exemplary embodiment, the system performs an audit of data structures between the projected state metadata database repository, actual state metadata database repository, and the actual state data mart server/database to identify changes in the actual state metadata database repository and the actual state data mart server/database that are inconsistent with projected data structures in the end product. The auditing process includes comparing data in the actual state metadata database repository and actual state data warehouse with the projected metadata repository. The results of the audit may be presented as a list of items that need to be reconciled. As will be understood by those in the art, the various storage areas may be in one database server or distributed among various databases. In addition embodiments may operate in a single physical data storage unit or may be distributed in a network of storage units including for example a cloud based environment.

Figure 2:
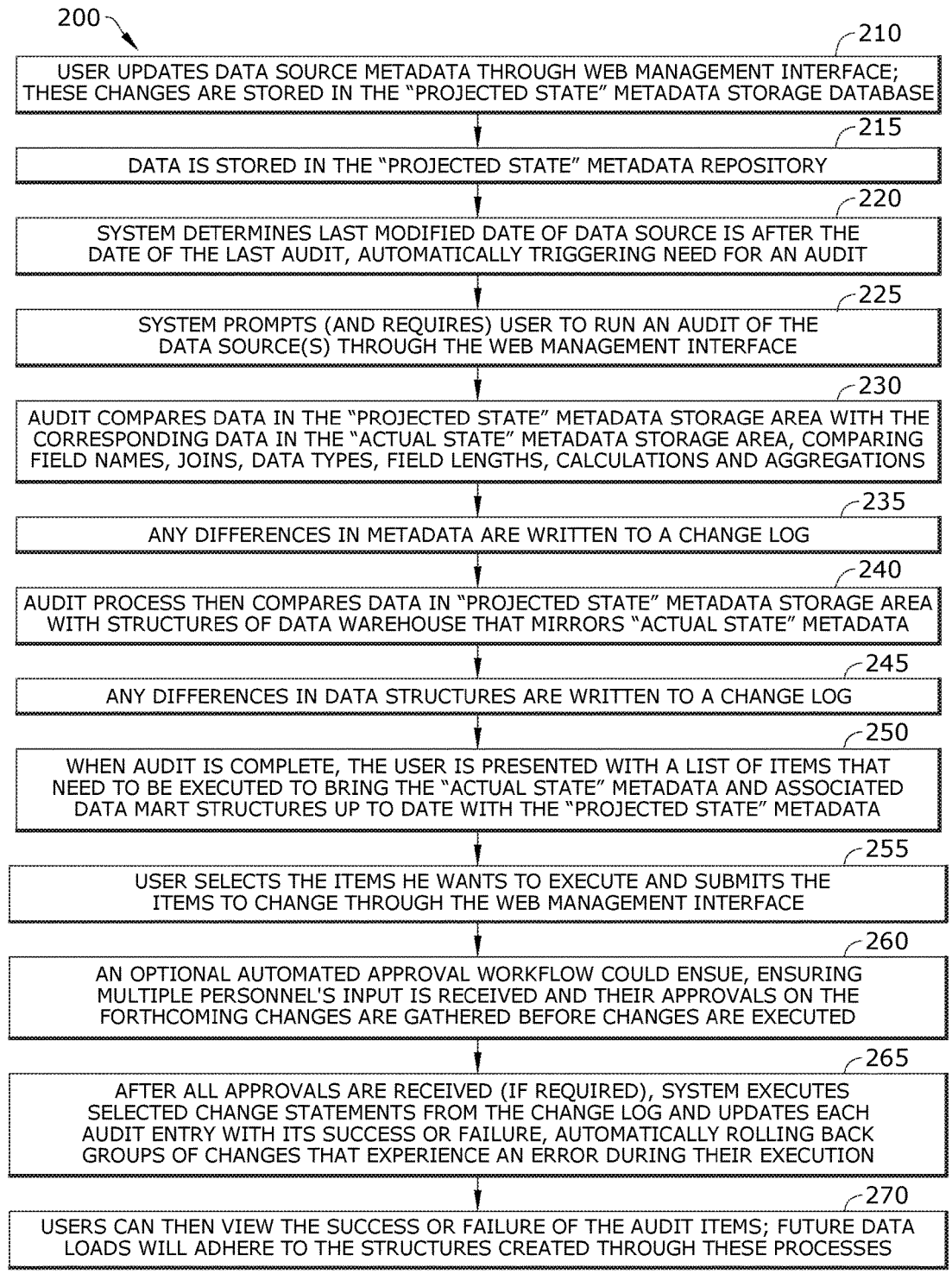
FIG. 2 is a flowchart of a method to audit data systems to discover changes and/or discrepancies among elements in accordance with an exemplary embodiment of the subject technology.

Referring now to FIG. 2, a method 200 for auditing data systems is shown according to an exemplary embodiment. The method 200 may initiate 210 storing changes in the projected state metadata storage database in response to a user update of the data source metadata through a web management interface. Data including the changes from the user update may be stored 215 in projected state metadata storage database. The system (via for example a processing unit) determines 220 whether a last modified date of data source is after the date of the last audit. If so, this condition may trigger a need for an audit. The system may prompt 225 (and in some embodiments requires) the execution of an audit of the environment through for example the web management interface. The audit process (through a processor) may compare 230 data in the projected state metadata storage area with the corresponding data fields in the actual state metadata storage area. The comparison may include comparing field names, joins, datatypes, field lengths, calculations, and aggregations. Any discrepancies may be recorded 235 to an audit log (sometimes referred to as a "change log"). In some embodiments, the audit process may also include comparing 240 corresponding data structures between the actual state data mart server/database and the projected state repository. If corresponding data structures between storage areas do not match, then any discrepancies may be recorded 245 to the audit log (change log). When the audit is complete, the system may provide 250 the user with a displayed list of items (incongruent data structures) that need to be executed to bring the actual state metadata storage area and actual state data mart server/database with the projected state metadata data store. A user may select 255 the items he wants to execute and submits the data through the web management interface. In some embodiments, an automated approval workflow process may be performed 260 which may include comparing data input from multiple personnel. Prior to each personnel member's input being accepted, the system may compare the input to the projected state data structures before any input changes are executed into the system. The system may execute 265 selected DDL and DML, statements once accepted by the system and updates each audit entry with its success or failure, rolling back groups of changes that experience an error during their execution. The success or failure of the audit items may be displayed 270 for users to view. Future data loads will adhere to the structures created through these processes.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed technology may take the form of a computer program product embodied in one or more computer readable media having computer readable program code embodied thereon.

Aspects of the disclosed invention are described above (and/or below) with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor of a computer system/server, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

A computer system/server may represent for example the machine providing functions related to the automated auditing of data structures for changes when acting in the role of the providing the process. The computer system/server may also represent for example the machine providing functions related to storage of data including for example the projected state metadata storage area, the actual state metadata storage area, and the actual state data warehouse. The components of the computer system/server may include one or more processors or processing units, a system memory, and a bus that couples various system components including the system memory to the processor. The computer system/server may be for example, personal computer systems, tablet devices, mobile telephone devices, server computer systems, handheld or laptop devices, multiprocessor systems, microprocessor-based systems, set top boxes, programmable consumer electronics, network PCs, dedicated network computers, and distributed cloud computing environments that include any of the above systems or devices, and the like. The computer system/server may be described in the general context of computer system executable instructions, such as program modules, being executed by the computer system. The computer system/server and auditing process(es) may be practiced in distributed cloud computing environments where tasks are performed by remote processing devices that are linked through a communications network. In a distributed cloud computing environment, program modules may be located in both local and remote computer system storage media including memory storage devices.

The computer system/server may typically include a variety of computer system readable media. Such media could be chosen from any available media that is accessible by the computer system/server, including non-transitory, volatile and non-volatile media, removable and non-removable media. The system memory could include one or more computer system readable media in the form of volatile memory, such as a random access memory (RAM) and/or a cache memory. By way of example only, a storage system can be provided for reading from and writing to a non-removable, non-volatile magnetic media device. The system memory may include at least one program product having a set (e.g., at least one) of program modules that are configured to carry out the functions of receiving data changes, comparing data structures, and determining discrepancies between data structures, and reconciling data discrepancies in response to user execution. Each of the application programs, other program modules, and program data or some combination thereof, may include an implementation of a networking environment.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A computer program product for auditing data systems to discover changes or discrepancies, the computer program product comprising a non-transitory computer readable storage medium having computer readable program code embodied therewith, the computer readable program code being configured by a processor to:
   detect a user update of metadata of a data source through a web management interface;
   determine whether a last modified date of the data source, being distinct and different from the metadata, is after a date of a last audit;
   prompt a need for an audit to a user on the web management interface page in audit;
   in response to the user triggering the audit, perform a comparison of data structures of the metadata in an actual state metadata storage area with corresponding data structures of the metadata in a projected state metadata storage area, wherein:
      the data structures in the projected state metadata storage area include a list of data structures expected to be present in the data source as of the last audit date, and
      the data structures in the actual state metadata storage area include user-entered new metadata or updated metadata of the data source;
   record the changes or discrepancies discovered in the comparison in an audit log;
   display through the web management interface, the audit log including a list of data structure items in the actual state metadata storage area to be executed to match the corresponding data structures in the projected state metadata storage area;
   execute the list of data structure items to update the data structures in the actual state metadata storage area until matching with the corresponding data structures in the projected state metadata storage area; and
   update the data source in accordance with the updated data structures in the actual state metadata storage area.

2. The computer program product of claim 1, further comprising computer readable program code being configured to determine, as an audit entry, whether an executed one of the list of data structure items in the actual state metadata storage area matches with a respective corresponding one of the data structures in the projected state metadata storage area.

3. The computer program product of claim 2, further comprising computer readable program code being configured to update the audit entry with a success or failure tag in response to the determination.

4. The computer program product of claim 3, further comprising computer readable program code being configured to automatically roll back the audit entry in response to determining that the executed one of the list of data structure items in the actual state metadata storage area faded to match with the respective corresponding one of the data structures in the projected state metadata storage area or resulted in an executable error.

5. A method of auditing data systems, performed by a processor, to discover changes or discrepancies, comprising:
   detecting a user update of metadata of a data source through a web management interface;
   determining whether a last modified date of the data source, being distinct and different from the metadata, is after a date of a last audit;
   prompting a need for an audit to user on the web management interface page in response to the last modified date of the data source being after the date of the last audit;
   in response to the user triggering the audit, comparing data structures of the metadata in an actual state metadata storage area with corresponding data structures of the metadata in a projected state metadata storage area, wherein:
      the data structures in the projected state metadata storage area include a audit date, and
      the data structures in the actual state metadata storage area include user-entered new metadata or updated metadata of the data source;
   recording the chances or discrepancies discovered in the comparison in an audit log;
   displaying through the web management interface, the audit log including a list of data structure items in the actual state metadata storage area to be executed to match the corresponding data structures in the projected state metadata storage area;
   executing the list of data structure items to update the data structures in the actual state metadata storage area until matching with the corresponding data structures in the projected state metadata storage area; and
   update the data source in accordance with the updated data structures in the actual state metadata storage area.

6. The method of claim 5, further comprising determining, as an audit entry, whether an executed one of the list of data structure items in the actual state metadata storage area matches with a respective corresponding one of the data structures in the projected state metadata storage area.

7. The method of claim 6, further comprising updating the audit entry with a success or failure tag in response to the determination.

8. The method of claim 7, further comprising automatically rolling back the audit entry in response to determining that the executed one of the list of data structure items in the actual state metadata storage area failed to match with the respective corresponding one of the data structures in the projected state metadata storage area or resulted in an executable error.

* * * * *